US011774579B1

(12) United States Patent
Wang et al.

(10) Patent No.: US 11,774,579 B1
(45) Date of Patent: Oct. 3, 2023

(54) UNMANNED AIRBORNE GROUND PENETRATING RADAR SYSTEM AND INSPECTION METHOD FOR DAM HIDDEN DANGER DETECTION

(71) Applicant: SHANDONG UNIVERSITY, Jinan (CN)

(72) Inventors: Zhengfang Wang, Jinan (CN); Jing Wang, Jinan (CN); Qingmei Sui, Jinan (CN); Lei Jia, Jinan (CN)

(73) Assignee: Shandong University, Jinan (CN)

( * ) Notice: Subject to any disclaimer, the term of this patent is extended or adjusted under 35 U.S.C. 154(b) by 0 days.

(21) Appl. No.: 18/146,323

(22) Filed: Dec. 23, 2022

(30) Foreign Application Priority Data

May 6, 2022 (CN) .......................... 202210483000.6

(51) Int. Cl.
*G01S 13/88* (2006.01)
*H01Q 21/24* (2006.01)

(52) U.S. Cl.
CPC ........... *G01S 13/885* (2013.01); *H01Q 21/24* (2013.01); *G01S 2205/03* (2020.05)

(58) Field of Classification Search
CPC ...... G01N 23/00; G01N 21/95; G01S 13/885; G01S 2205/03; H01Q 21/24
USPC ............. 324/323–332, 600, 500, 76.11, 636, 324/754.1, 754.03, 754.01, 754, 13, 324/754.14, 756.03, 756.04, 757.04, 324/757.05, 754.2
See application file for complete search history.

(56) References Cited

U.S. PATENT DOCUMENTS

| 10,033,100 B1 * | 7/2018 | Chayat ................... H01Q 5/378 |
| 2019/0064362 A1 | 2/2019 | Scott | |

FOREIGN PATENT DOCUMENTS

| CN | 104280719 A | 1/2015 | |
| CN | 106716285 A | 5/2017 | |
| CN | 108287370 A | 7/2018 | |
| CN | 108318499 A * | 7/2018 | ............. G01N 21/95 |
| CN | 108318499 A | 7/2018 | |

(Continued)

OTHER PUBLICATIONS

English Machine Translation CN-108318499A (Year: 2018).*

(Continued)

*Primary Examiner* — Lee E Rodak
*Assistant Examiner* — Trung Q Nguyen (57) ABSTRACT

Disclosed are an unmanned airborne ground penetrating radar system and an inspection method for a dam hidden danger detection, including an unmanned aerial vehicle (UAV) system; the UAV system includes an unmanned aerial vehicle, a sensor platform, a radar platform, a forward-looking laser rangefinder and a ground penetrating radar; the sensor platform is installed on the UAV, and the forward-looking laser rangefinder is installed on the sensor platform, and the radar platform is installed on the UAV at one side of the sensor platform; moreover, the ground penetrating radar is installed on the radar platform, and a variable polarization ground penetrating radar antenna array is arranged in the ground penetrating radar; the variable polarization ground penetrating radar antenna array includes a substrate, and a plurality of groups of orthogonal dual-polarization Vivaldi antenna transmitting subarrays and receiving subarrays are mounted on the substrate.

5 Claims, 7 Drawing Sheets

(56) References Cited

FOREIGN PATENT DOCUMENTS

| CN | 109032157 A | 12/2018 |
| CN | 110147116 A | 8/2019 |
| CN | 110770597 A | 2/2020 |
| CN | 113594680 A | 11/2021 |

OTHER PUBLICATIONS

First Office Action issued in counterpart Chinese Patent Application No. 202210483000.6, dated Jun. 13, 2022.
Second Office Action issued in counterpart Chinese Patent Application No. 202210483000.6, dated Jun. 29, 2022.
Wu et al., Design of broadband circular polarization Vivaldi antenna array for X-band applications, Electronic Design Engineering, vol. 22, No. 5, pp. 95-98, dated Mar. 15, 2014.

\* cited by examiner

UNMANNED AIRBORNE GROUND PENETRATING RADAR SYSTEM AND INSPECTION METHOD FOR DAM HIDDEN DANGER DETECTION

CROSS-REFERENCE TO RELATED APPLICATIONS

This application claims priority to Chinese Patent Application No. 202210483000.6, filed on May 6, 2022, the contents of which are hereby incorporated by reference.

TECHNICAL FIELD

The application relates to the technical field of unmanned airborne ground penetrating radars, and in particular to an unmanned airborne ground penetrating radar system and an inspection method for a dam hidden danger detection.

BACKGROUND

In a long-term service process of dams and other infrastructure, there are many hidden dangers such as caves, cracks, leakages and looseness. These hidden dangers directly affect lives of the dams and even cause disasters and accidents. Therefore, it is an urgent need to adopt an advanced detection technology to comprehensively detect dam hidden dangers to ensure safe services the dams. Among many geophysical detection technologies, a ground penetrating radar has become a mainstream technology for detecting the hidden dangers in shallow layers of the dams because of characteristics of rapidness and convenience. The existing ground penetrating radar is generally in a single polarization mode, so it is difficult to distinguish electromagnetic wave signals reflected by the hidden dangers in different shapes and directions, so it is impossible to comprehensively and accurately detect the hidden dangers in various shapes, different distribution positions and orientations inside the dams.

Polarization is an important parameter of the polarized electromagnetic wave. In a ground penetrating radar detection, polarization information is sensitive to the shape and distribution orientation of the target inside a measured structure. The hidden dangers in different positions, directions and shapes may be distinguished by collecting different polarization information, and a blind area where a conventional single polarization ground penetrating radar is insensitive to the hidden dangers in a certain direction (such as the direction parallel to a survey line and perpendicular to a detection surface) may be broken.

At present, the ground penetrating radar that may obtain polarization information mostly adopts a linear polarization detection. The linear polarization detection is mainly divided into a horizontal polarization detection and a vertical polarization detection, which respectively means that a polarization direction of the electromagnetic wave is vertical or horizontal relative to a reference ground during the detection. At present, existing multi-polarization ground penetrating radars are mainly the multi-polarization ground penetrating radars with fully-polarized antenna arrays, hybrid polarization ground penetrating radars and the ground penetrating radars with antenna arrays with various polarization characteristics. Among them, a fully-polarized ground penetrating radar realizes a combined detection mode of multiple polarization modes through a separate arrangement of antenna array elements with different polarization directions and a time-sharing feeding. However, in a detection process, the fully-polarized ground penetrating radar needs a time-sharing detection with a help of switch, and the combined detections of a horizontal-horizontal polarization, a horizontal-vertical polarization, a vertical-vertical polarization and a vertical-horizontal polarization is completed through multiple measurements, so the detection process is complicated. In the detection, the hybrid polarization ground penetrating radar transmits circularly polarized waves by a circularly polarized helical antenna, and receives by antennas with different polarization directions, and the detection results of multiple polarization modes may be obtained by one measurement. However, the above-mentioned systems use different antennas for transmission and reception, thus leading to an inconsistency of performances and bandwidths. A small-volume circularly polarized helical antenna for the UAV is suitable for transmitting high-frequency and narrow-band signals. When the small-volume circularly polarized helical antenna is used as a transmitting antenna, it has a performance mismatch with a linear polarized broadband receiving antenna, so a antenna performance is seriously affected. In addition, as a transmitting antenna, a single antenna limits an antenna gain, thus affecting a detection depth of the ground penetrating radar. However, the ground penetrating radar with multi-polarization antenna arrays realizes a dual-polarization detection through a combination of two antenna arrays with a single polarization direction. This method improves the gain of ground penetrating radar antennas, but the antenna array elements themselves have no multi-polarization characteristics. A multi-polarization detection based on a time-sharing feed of the array also requires multiple measurements of the radar on the same survey line, and a radar volume is large, so the detection is inconvenient.

In addition, in terms of ground penetrating radar (ground penetrating radar) detection methods, a conventional ground penetrating radar work requires people to hold the antennas or use other machinery to assist in a detection work, so it is difficult to carry out work in complex environment. In a task of dam hidden danger detection, it is often necessary to keep the radar antenna at a small distance from the ground and constant to ensure stable imaging. The radar antenna of the existing unmanned airborne ground penetrating radar technology has some shortcomings in attaching to various complex terrain during the journey. In dam hidden danger detection, ground penetrating radar and unmanned aerial vehicle (UAV) need to adjust their posture in real time according to the change of terrain to adapt to the change of terrain. Therefore, the application proposes unmanned airborne polarized ground penetrating radar system and patrol inspection method for dam hidden danger detection to solve the problems existing in the prior art.

SUMMARY

In view of the above problems, an objective of the application is to propose an unmanned airborne ground penetrating radar system and an inspection method for a dam hidden danger detection. The unmanned airborne ground penetrating radar system and the inspection method for the dam hidden danger detection utilize an unmanned aerial vehicle (UAV) to carry a variable polarization ground penetrating radar, have advantages of an omni-directional and high-precision detection of dam hidden dangers and solve the problems in the prior art.

To realize the objective of the application, the application is realized by following technical schemes: the unmanned airborne ground penetrating radar system and the inspection method for the dam hidden danger detection include a UAV system; the UAV system includes an unmanned aerial vehicle, a sensor platform, a radar platform, a forward-looking laser rangefinder and a ground penetrating radar; the sensor platform is installed on the UAV, and the forward-looking laser rangefinder is installed on the sensor platform, and the radar platform is installed on the UAV at one side of the sensor platform; and the ground penetrating radar is installed on the radar platform, and a variable polarization ground penetrating radar antenna array is arranged in the ground penetrating radar;

the variable polarization ground penetrating radar antenna array includes a substrate, and a plurality of groups of orthogonal dual-polarization Vivaldi antenna transmitting subarrays and orthogonal dual-polarization Vivaldi antenna receiving subarrays are mounted on the substrate; the plurality of orthogonal dual-polarization Vivaldi antenna transmitting subarrays each includes two groups of orthogonal Vivaldi antenna array elements, a cross-shaped dielectric substrate, a gradual opening slot, conductor patches and a crossed balun feed structure.

In an embodiment, each orthogonal dual-polarization Vivaldi antenna transmitting subarray and each orthogonal dual-polarization Vivaldi antenna receiving subarray are composed of orthogonal dual-polarization Vivaldi antenna array elements and a feed network to form a 2×2 antenna array, in which four groups of transmitting antennas work simultaneously and four groups of receiving antennas work simultaneously.

In an embodiment, each orthogonal dual-polarization Vivaldi antenna array element is composed of two groups of Vivaldi antennas which are placed orthogonally in a cross, and polarization modes of the two groups of Vivaldi antennas are vertical polarization and horizontal polarization respectively.

In an embodiment, the crossed balun feed structure is a mutual feed structure in which a microstrip line-stripline on the Vivaldi antenna in each orthogonal dual-polarization Vivaldi antenna array element is connected to a back of the Vivaldi antenna orthogonal to the microstrip line-stripline in the subarray, and energy is coupled to an upper surface slot line, so that an upper surface feed line of the antenna feeds the other orthogonal antenna.

In an embodiment, when the two groups of Vivaldi antennas in each orthogonal dual-polarization Vivaldi antenna array element simultaneously transmit the signals with an equal amplitude and a phase difference of 90°, circularly polarized electromagnetic waves are transmitted, and a mixed polarization detection mode of "circularly polarized transmission-linearly polarized reception" is formed.

In an embodiment, when the two groups of Vivaldi antennas in each orthogonal dual-polarization Vivaldi antenna array element transmit the signals with the equal amplitude and the phase difference of 0° in time sharing, horizontal or vertical polarized electromagnetic waves are respectively transmitted, and a "linearly polarized transmission-linearly polarized reception" is formed.

An inspection method of an unmanned airborne ground penetrating radar system for a dam hidden danger detection includes following steps:

Step 1: starting the sensor platform, where the sensor platform is internally provided with an inclination angle control algorithm with an adaptive speed; and Step 2: controlling an angle between the laser rangefinder and a traveling plane by the inclination angle control algorithm with the adaptive speed according to the speed of the UAV, and keeping the angle constant during a traveling of the UAV to adapt to an attitude advance control of the UAV on the plane where the ground penetrating radar antenna array is located in a dam hidden danger detection task under different flight speed conditions.

The unmanned airborne ground penetrating radar system and inspection method for dam hidden danger detection have beneficial effects that the 2×2 antenna arrays are formed by adopting the plurality of groups of orthogonal dual-polarization Vivaldi antenna array elements and the feed networks, a gain and a directivity of an antenna system are enhanced and a detection depth of the ground penetrating radar is improved by superposing the electromagnetic waves generated by different array elements in the same polarization mode; meanwhile, the orthogonal dual-polarization Vivaldi antenna transmitting and receiving subarrays are controlled by a variable polarization feed mode, the transmitting subarrays adopt a multi-polarization mode variable feed, and the receiving subarrays adopt a horizontal and vertical dual-channel receiving. Various detection methods such as mixed polarization and full polarization may be realized by changing amplitude signals emitted by two orthogonal bipolarized Vivaldi antennas, and more refined and comprehensive detection information may be obtained. The unmanned airborne ground penetrating radar is also be adopted, making a dam hidden danger detection task in a long survey line of a complex terrain more efficient and safer. The angle between the laser rangefinder and the traveling plane is controlled by the angle control algorithm built in the sensor platform with the adaptive speed according to the speed of the UAV, so as to ensure that the ground penetrating radar always keeps a constant distance from the ground near the ground and is parallel to the ground in an all-terrain dam hidden danger detection task.

DETAILED DESCRIPTION OF THE EMBODIMENTS

In order to deepen an understanding of the application, the application is further described below with embodiments.

The embodiments are only used to explain the application and do not constitute a limitation on a scope of protection of the application.

As shown in FIGS. 1-6, this embodiment proposes an unmanned airborne ground penetrating radar system for a dam hidden danger detection, including an unmanned aerial vehicle (UAV) system; the UAV system includes an unmanned aerial vehicle 1, a sensor platform 2, a radar platform 3, a forward-looking laser rangefinder 4 and a ground penetrating radar 5; the sensor platform 2 is installed on the UAV 1, the forward-looking laser rangefinder 4 is installed on the sensor platform 2, and the radar platform 3 is installed on the UAV 1 at one side of the sensor platform 2. Moreover, the ground penetrating radar 5 is installed on the radar platform 3, and a variable polarization ground penetrating radar antenna array is arranged in the ground penetrating radar 5; the sensor platform 2 controls the forward-looking laser rangefinder 4 to have a constant angle with respect to a flight plane of the UAV 1, so that the sensor platform 2 senses a change of a front terrain in advance and realizes an advance control; the radar platform 3 receives a reading of the forward-looking laser rangefinder 4, and angles of the ground penetrating radar 5 in a traveling direction and a vertical direction are controlled on the radar platform 3, so that the ground penetrating radar 5 is parallel to a ground to ensure an imaging stability; and the UAV 1 calculates a flight trajectory according to data of the forward-looking laser rangefinder 4 to achieve a terrain following.

Figure 1:
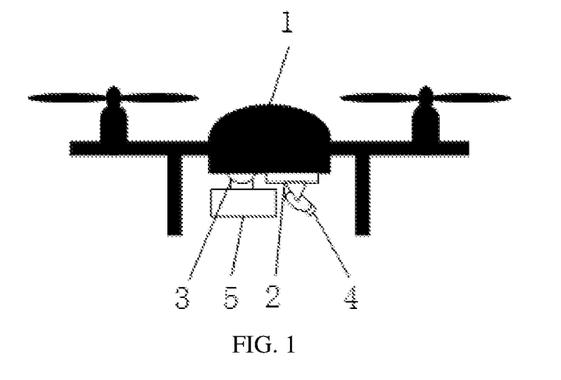
FIG. 1 is a schematic structural diagram of an unmanned airborne ground penetrating radar according to the application.
Figure 2:
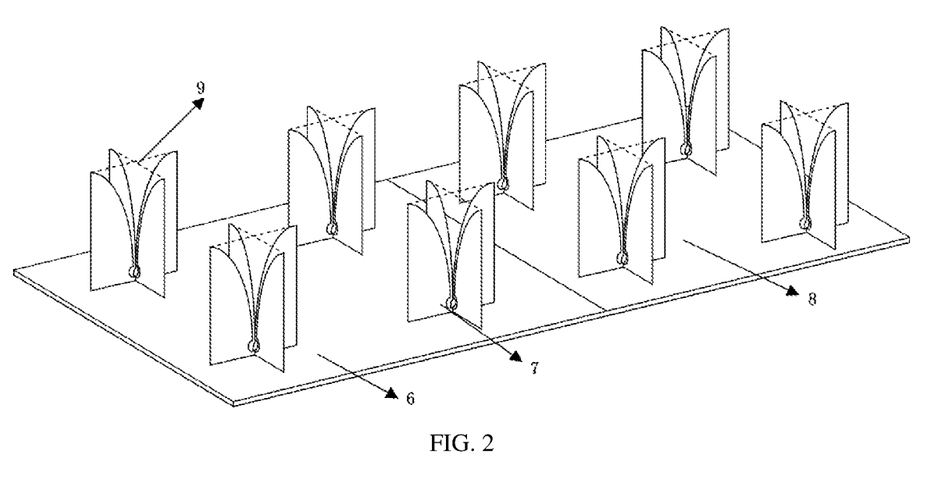
FIG. 2 is a schematic structural diagram of a variable polarization ground penetrating radar antenna array according to the application.
Figure 3:
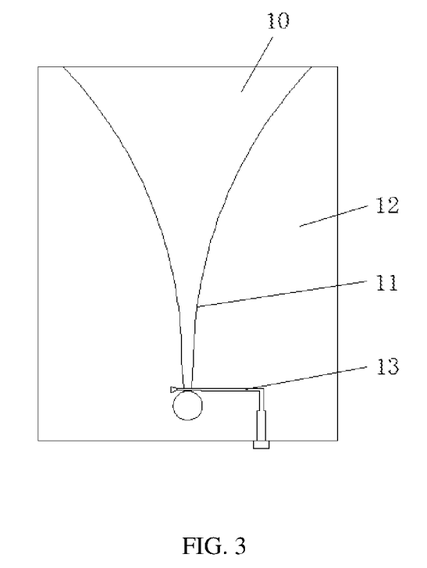
FIG. 3 is a schematic diagram of a Vivaldi antenna array element structure according to the application.

The variable polarization ground penetrating radar antenna array includes a substrate 6, a plurality of groups of orthogonal dual-polarization Vivaldi antenna transmitting subarrays 7 and orthogonal dual-polarization Vivaldi antenna receiving subarrays 8 are mounted on the substrate 6, and corresponding feed networks are also included; the plurality of groups of orthogonal dual-polarization Vivaldi antenna transmitting subarrays 7 each includes two groups of orthogonal Vivaldi antenna array elements 9, a cross-shaped dielectric substrate 10, a gradual opening slot 11, conductor patches 12 and a crossed balun feed structure 13; the gradual opening slot 11 formed by two exponential curves symmetrical about a center line of the substrate 6 is arranged on an upper surface of the cross-shaped dielectric substrate 10 to form a horn-shaped opening facing a maximum radiation direction of a Vivaldi antenna 14, and the upper surface part except the gradual opening slot 11 is covered by the conductor patches 12; each orthogonal dual-polarization Vivaldi antenna transmitting subarray 7 also includes a corresponding feed structure and a Wilkinson power divider, which are used to transmit and receive vertically polarized and horizontally polarized electromagnetic waves respectively, so that a combined detection size of dam hidden dangers is small, and a rapid detection with the UAV 1 is facilitated.

Each orthogonal dual-polarization Vivaldi antenna transmitting subarray 7 or each orthogonal dual-polarization Vivaldi antenna receiving subarray 8 is composed of orthogonal dual-polarization Vivaldi antenna array elements 9 and the feed network to form a 2×2 antenna array, in which four groups of transmitting antennas work simultaneously and four groups of receiving antennas work simultaneously. A gain and a directivity of an antenna system are enhanced and a detection depth of the ground penetrating radar is improved by superposing the electromagnetic waves generated by different array elements in a same polarization mode in time and space.

Each orthogonal dual-polarization Vivaldi antenna array element 9 is composed of two groups of Vivaldi antennas 14 which are placed orthogonally in a cross, and polarization modes of the two groups of Vivaldi antennas 14 are vertical polarization and horizontal polarization respectively.

Figure 4:
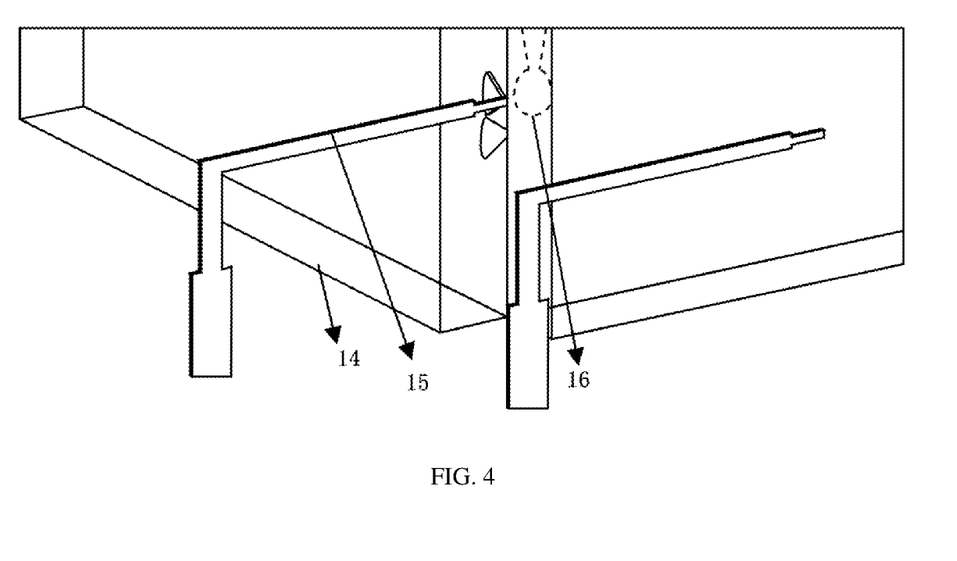
FIG. 4 is a schematic diagram of a crossed balun feed structure according to the application.

As shown in FIG. 4, the crossed balun feed structure 13 is a mutual feed structure in which a microstrip line-stripline 15 on the Vivaldi antenna 14 in each orthogonal dual-polarization Vivaldi antenna array element 9 is connected to a back of the Vivaldi antenna 14 orthogonal to the microstrip line-stripline 15 in the subarray, and energy is coupled to an upper surface slot line 16, so that an upper surface feed line of the antenna feeds the other orthogonal antenna. The crossed balun feed structure 13 consists of the microstrip line-stripline 15 on the antenna array element in the subarray and a double-sided slot line structure on the other antenna array element in the subarray. The microstrip line on each antenna array element is connected with a coaxial cable and transmits the energy to the stripline; the stripline extends to a fan-shaped branch on the surface of the other orthogonal antenna array element at an end, and couples the energy to the upper surface slot line of the other orthogonal antenna to form an effective radiation on the antenna, thus forming the crossed balun feed structure 13. A signal fed to one antenna array element in the dual-polarization Vivaldi antenna subarray forms the effective radiation on the other antenna array element placed orthogonal to the antenna array element.

Figure 5:
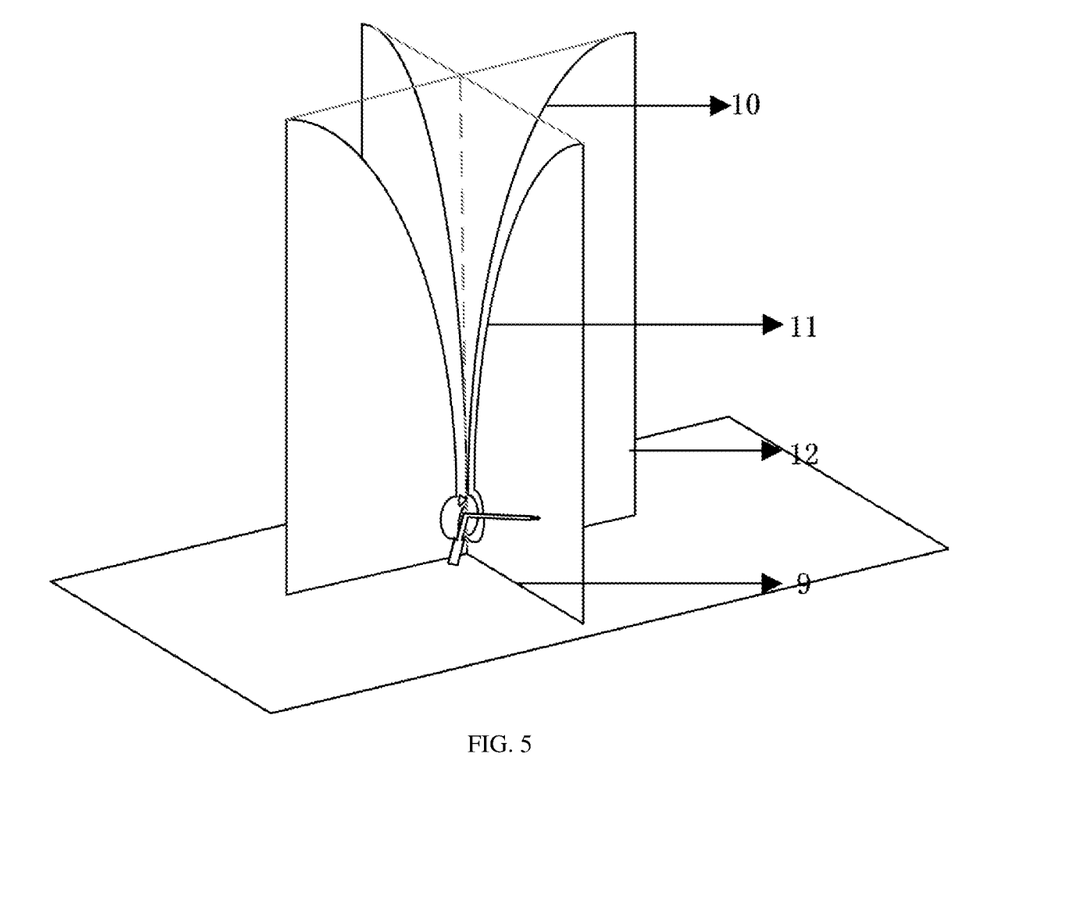
FIG. 5 is a schematic diagram of an orthogonal dual-polarization Vivaldi antenna transmitting subarray structure according to the application.

The structure of each orthogonal dual-polarization Vivaldi antenna transmitting subarray 7 is shown in FIG. 5. The main structure is two Vivaldi antennas 14 placed in a cross array, and the maximum radiation direction of the Vivaldi antennas 14 is along an intersecting axial direction. A feed mode of each orthogonal dual-polarization Vivaldi antenna subarray 8 is a variable polarization feed mode, which controls each orthogonal dual-polarization Vivaldi antenna transmitting subarray and receiving subarray 7. Each transmitting subarray adopts a multi-polarization mode variable feed, and each receiving subarray adopts a horizontal and vertical dual-channel receiving; when the two groups of Vivaldi antennas 14 in each orthogonal dual-polarization Vivaldi antenna array element 9 simultaneously transmit the signals with an equal amplitude and a phase difference of 90°, circularly polarized electromagnetic waves are transmitted, and a mixed polarization detection mode of "circularly polarized transmission-linearly polarized reception" is formed; when the two groups of Vivaldi antennas 14 in each orthogonal dual-polarization Vivaldi antenna array element 9 transmit the signals with the equal amplitude and the phase difference of 0° in time sharing, horizontal or vertical polarized electromagnetic waves are respectively transmitted, and a "linearly polarized transmission-linearly polarized reception" is formed, and fully-polarized detection modes of "horizontal-horizontal, horizontal-vertical, vertical-horizontal, vertical-vertical" are realized. When a trend of the dam hidden dangers is unclear, a multi-polarization detection may realize a fast and accurate detection.

In this embodiment, an advanced terrain perception is realized by adopting an advanced detection layout strategy based on a multi-sensor, and an all-terrain near-ground following of the ground penetrating radar 5 under an ultra-low altitude condition is realized by a double closed-loop attitude control mode based on an adjustment of the angle and a speed by the radar platform 3 with multi-sensor information fusion.

Figure 7:
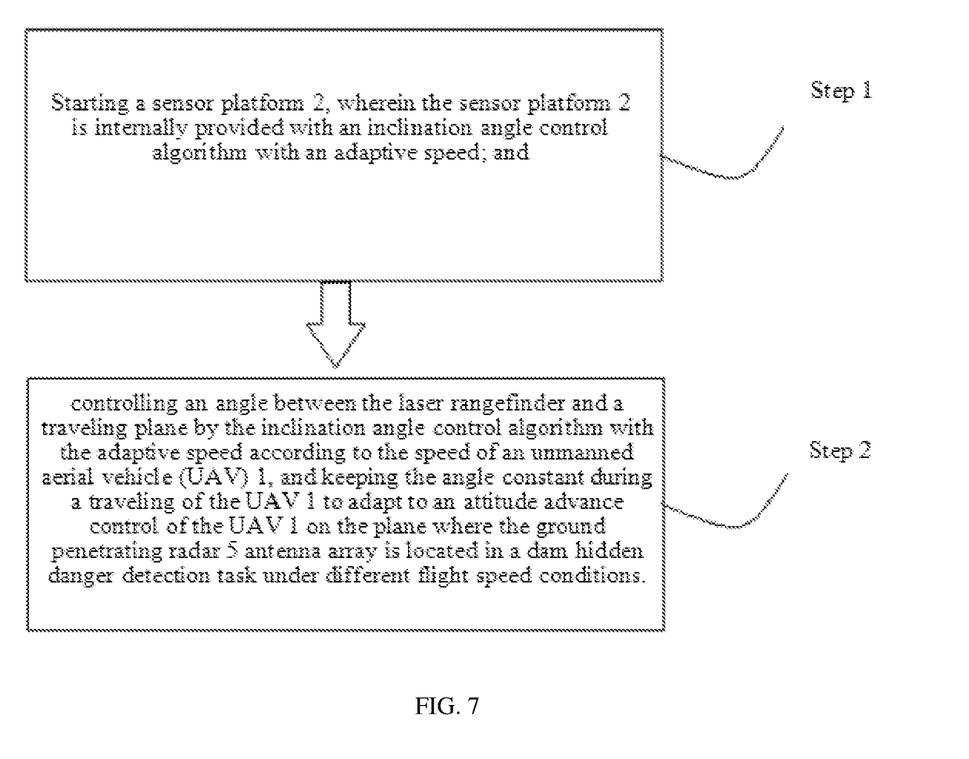
FIG. 7 is a schematic diagram of an inspection method of an unmanned airborne ground penetrating radar system for the dam hidden danger detection according to the application.

As shown in FIG. 7, an inspection method of an unmanned airborne ground penetrating radar system for a dam hidden danger detection includes following steps:

Step 1: starting the sensor platform 2, and the sensor platform 2 is internally provided with an inclination angle control algorithm with an adaptive speed; and Step 2: controlling an angle between the laser rangefinder and a traveling plane by the inclination angle control algorithm with the adaptive speed according to the speed of the UAV 1, and keeping the angle constant during a traveling of the UAV 1 to adapt to an attitude advance control of the UAV 1 on the plane where the ground penetrating radar 5 antenna array is located in a dam hidden danger detection task under different flight speed conditions.

Figure 6:
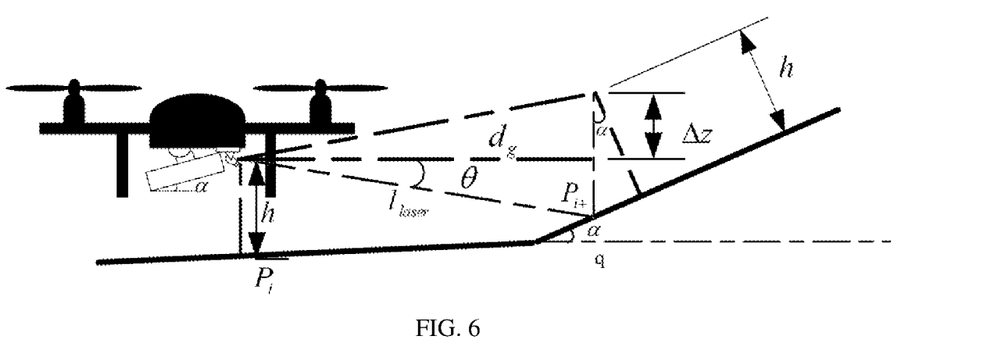
FIG. 6 is a schematic diagram of a geometric relationship calculation of an inspection method according to the application.

The specific steps of the Step 1 and the Step 2 are as follows:

the UAV 1 receives $x_0$, $y_0$ and $z_0$, where $x_0=x_{goal}$ and $y_0=y_{goal}$ are horizontal coordinates of a target, and $z_0=h$, h is a relative ground height to be controlled;

when the UAV 1 takes off, the sensor platform 2 is vertically downward, and an altitude is raised to h;

the angle $$\theta = \tan^{-1} \frac{v \times t_z}{h}$$

between the sensor platform 2 and the flight plane of the UAV is adjusted, and the UAV flies to the target, where v is a horizontal speed and $t_z$ is a vertical reaction time; the higher the speed of the UAV 1 in a flight process, the longer the horizontal distance $d_g$ is needed to adjust the altitude, and the longer the vertical reaction time $t_z$ is needed; because in a long survey line inspection process, a constant speed flight is generally adopted, the horizontal speed v is given, the reasonable vertical reaction time $v_z$ is calculated through a vertical speed $v_z$ of an aircraft; the angle θ between the forward-looking laser rangefinder 4 and the traveling plane is calculated by $$\theta = \tan^{-1} \frac{v \times t_z}{h},$$

and θ is controlled to remain unchanged by the sensor platform 2 during the traveling process; the radar platform 3 keeps the readings of the two radar side laser rangefinders consistent all the time during the traveling process, as shown in FIG. 6, so that the ground penetrating radar 5 is kept relatively parallel to the ground in the vertical direction of the traveling direction;

when a height change is detected, the coordinates $P_{i+1}$ of the measuring point are determined, the slope $$\alpha = \arctan \frac{[?] l_{laser}^i - l_{laser[?]}^{i+1} \cdot \sin\theta}{v\Delta t - [?] l_{laser}^i - l_{laser[?]}^{i+1} \cdot \cos\theta},$$

a deflection angle $$\gamma = \arctan \frac{laser2 - laser3}{w}$$

and the height change $\Delta z = h \times \sec\alpha - l_{laser} \times \sin\theta$ in a Y-axis direction of the ground penetrating radar are determined; laser is the distance from the target point to the aircraft measured by the laser rangefinder, laser2 and laser3 are the distances from a measured surface measured by laser rangefinder sensors on both sides of the ground penetrating radar 5, and w is the distance between the laser rangefinder sensors on both sides of the ground penetrating radar 5; and $\Delta t = 1/f$, where f is a sampling frequency of the forward-looking laser rangefinder 4; the radar platform 3 controls the inclination angle of the ground penetrating radar 5 in the traveling direction to be a and the inclination angle γ in the y axis direction to be by adopting a double-closed-loop control mode based on the angle and speed, so that the ground penetrating radar 5 is always kept parallel to the ground;

the coordinates $x_{i+1}$, $y_{i+1}$, $z_{i+1}$ of the measuring point are calculated, where $x_{i+1} = d_g \times \cos \varphi + x_i$ $y_{i+1} = d_g \times \sin \varphi + y_i,$ where φ is a yaw angle of a flight direction of UAV 1, $d_g = l_{laser} \times \cos\theta$, and $z_{i+1} = z_i + \Delta z$, and h may be kept at the measuring point;

the UAV 1 moves to $x_{i+1}$, $y_{i+1}$, $z_{i+1}$ until the UAV 1 reaches the position, and then continue to move to $x_0$, $y_0$, and controls the vertical speed during a movement:

$$v_z = \frac{z_{i+1} - z_{current}}{z_{i+1} - z_i} \times v_{z\_max},$$

where $z_{current}$ is a current altitude, and $v_{z\_max}$ is an upper speed limit of the UAV 1 in the vertical direction; if another altitude change is detected, steps S4-S6 are repeated; and the UAV 1 stops when the UAV 1 reaches $x_0$, $y_0$.

The above shows and describes a basic principle, main features and advantages of the application. It should be understood by those skilled in the art that the application is not limited by the above-mentioned embodiments. The above-mentioned embodiments and descriptions only illustrate principles of the application. Without departing from a spirit and a scope of the application, there are various changes and improvements of the application, all of which fall within the scope of the claimed application. The scope of the application is defined by the appended claims and their equivalents.

What is claimed is:

1. An unmanned airborne ground penetrating radar system for a dam hidden danger detection, comprising an unmanned aerial vehicle system, wherein the unmanned aerial vehicle system comprises an unmanned aerial vehicle, a sensor platform, a radar platform, a forward-looking laser rangefinder and a ground penetrating radar; the sensor platform is installed on the unmanned aerial vehicle, and the forward-looking laser rangefinder is installed on the sensor platform, and the radar platform is installed on the unmanned aerial vehicle at one side of the sensor platform; and the ground penetrating radar is installed on the radar platform, and a variable polarization ground penetrating radar antenna array is arranged in the ground penetrating radar;

the variable polarization ground penetrating radar antenna array comprises a substrate, orthogonal dual-polarization Vivaldi antenna transmitting subarrays and orthogonal dual-polarization Vivaldi antenna receiving subarrays; the orthogonal dual-polarization Vivaldi antenna transmitting subarrays and the orthogonal dual-polarization Vivaldi antenna receiving subarrays are mounted on the substrate; each of the orthogonal dual-polarization Vivaldi antenna transmitting subarrays and the orthogonal dual-polarization Vivaldi antenna receiving subarrays comprises an orthogonal dual-polarization Vivaldi antenna array element;

the orthogonal dual-polarization Vivaldi antenna array elements of the orthogonal dual-polarization Vivaldi antenna transmitting subarrays and a feed network form a 2×2 antenna array, the orthogonal dual-polarization Vivaldi antenna array elements of the orthogonal dual-polarization Vivaldi antenna receiving subarrays and another feed network form another 2×2 antenna array; and four transmitting antennas work simultaneously and four receiving antennas work simultaneously;

each orthogonal dual-polarization Vivaldi antenna array element comprises: two Vivaldi antennas disposed on the substrate, and polarization modes of the two Vivaldi antennas are vertical polarization and horizontal polarization respectively; and each of the two Vivaldi antennas comprises:

a dielectric substrate, disposed on the substrate; wherein the dielectric substrate comprises a first surface and a second surface parallel to each other, the first surface comprises: a first area and a second area, boundaries between the first area and the second area comprises: two exponential curves symmetrical with a center line of the dielectric substrate;

a conductor patch, covering the first area of the first surface of the dielectric substrate;

an opening slot with a horn-shaped opening, defined by the conductor patch and corresponding to the second area of the first surface of the dielectric substrate; wherein two edges of the opening slot coincide with the two exponential curves;

a microstrip line, disposed on the second surface of the dielectric substrate and configured to connect a coaxial cable; and a stripline, disposed on the second surface of the dielectric substrate and connected to the microstrip line;

the two Vivaldi antennas of the orthogonal dual-polarization Vivaldi antenna array element are placed orthogonally in a cross to form a crossed balun feed structure, and in the crossed balun feed structure, the stripline of one of the two Vivaldi antennas is connected to the second surface of the other one of the two Vivaldi antennas, thereby energy from the microstrip line to the stripline of the one Vivaldi antenna is coupled to the first surface of the other Vivaldi antenna to form radiation through the second surface of the other Vivaldi antenna;

when the two Vivaldi antennas in each orthogonal dual-polarization Vivaldi antenna array element simultaneously transmit signals with an equal amplitude and a phase difference of 90°, circularly polarized electromagnetic waves are transmitted from the orthogonal dual-polarization Vivaldi antenna transmitting subarrays to the orthogonal dual-polarization Vivaldi antenna receiving subarrays, and a mixed polarization detection mode of "circularly polarized transmission-linearly polarized reception" is formed; and when the two Vivaldi antennas in each orthogonal dual-polarization Vivaldi antenna array element transmit signals with an equal amplitude and a phase difference of 0° in time sharing, horizontal or vertical polarized electromagnetic waves are respectively transmitted from the orthogonal dual-polarization Vivaldi antenna transmitting subarrays to the orthogonal dual-polarization Vivaldi antenna receiving subarrays, and a detection mode of "linearly polarized transmission-linearly polarized reception" is formed.

2. An inspection method of the unmanned airborne ground penetrating radar system for the dam hidden danger detection according to claim 1, comprising:

step 1: starting the sensor platform, wherein the sensor platform is internally provided with an inclination angle control algorithm with an adaptive speed; and step 2: controlling an angle between the laser rangefinder and a traveling plane by the inclination angle control algorithm with the adaptive speed according to the speed of the unmanned aerial vehicle, and keeping the angle constant during a traveling of the unmanned aerial vehicle to adapt to an attitude advance control of the unmanned aerial vehicle on the plane where the ground penetrating radar antenna array is located in a dam hidden danger detection task under different flight speed conditions.

3. The unmanned airborne ground penetrating radar system for a dam hidden danger detection according to claim 1, wherein the horn-shaped opening faces toward a maximum radiation direction of the Vivaldi antenna.

4. The unmanned airborne ground penetrating radar system for a dam hidden danger detection according to claim 1, wherein in the crossed balun feed structure, the microstrip line of the one Vivaldi antennas is connected to the coaxial cable to receive the energy, the microstrip line transmits the energy to the stripline, the stripline extends to a fan-shaped branch on the second surface of the other Vivaldi antenna, the fan-shaped branch disposed on the second surface of the other Vivaldi antenna is coupled with slot lines of the opening slot of the first surface of the other Vivaldi antenna to form the radiation.

5. The unmanned airborne ground penetrating radar system for a dam hidden danger detection according to claim 1, wherein the dielectric substrates of the two Vivaldi antennas of the orthogonal dual-polarization Vivaldi antenna array element are placed orthogonally in a cross to form a cross-shaped dielectric substrate.

\* \* \* \* \*